(12) United States Patent
Halfmann et al.

(10) Patent No.: US 8,009,755 B2
(45) Date of Patent: Aug. 30, 2011

(54) METHOD FOR DIGITAL WIRELESS MESSAGE TRANSMISSION OVER A BROADBAND MOBILE RADIO CHANNEL

(76) Inventors: Rüdiger Halfmann, Otterberg (DE);
Eduard Jorswieck, Berlin (DE); Egon Schulz, München (DE); Martin Weckerle, Ulm (DE)

( * ) Notice: Subject to any disclaimer, the term of this patent is extended or adjusted under 35 U.S.C. 154(b) by 427 days.

(21) Appl. No.: 12/087,582

(22) PCT Filed: Dec. 12, 2006

(86) PCT No.: PCT/EP2006/069595
§ 371 (c)(1),
(2), (4) Date: Oct. 2, 2008

(87) PCT Pub. No.: WO2007/082609
PCT Pub. Date: Jul. 26, 2007

(65) Prior Publication Data
US 2009/0135941 A1 May 28, 2009

(30) Foreign Application Priority Data
Jan. 12, 2006 (EP) .................................. 06000638

(51) Int. Cl.
*H04B 7/02* (2006.01)
(52) U.S. Cl. .................. 375/267; 375/295; 375/316
(58) Field of Classification Search .................. 375/260, 375/267, 295, 316
See application file for complete search history.

(56) References Cited

U.S. PATENT DOCUMENTS

| 7,539,501 | B2 * | 5/2009 | Moorti et al. ................. 455/458 |
| 2002/0191703 | A1 * | 12/2002 | Ling et al. ..................... 375/267 |
| 2004/0001429 | A1 * | 1/2004 | Ma et al. ........................ 370/210 |
| 2004/0179627 | A1 * | 9/2004 | Ketchum et al. ............... 375/267 |
| 2005/0030891 | A1 * | 2/2005 | Stephens et al. .............. 370/229 |
| 2005/0047515 | A1 | 3/2005 | Walton et al. |
| 2007/0177681 | A1 * | 8/2007 | Choi et al. .................... 375/260 |

OTHER PUBLICATIONS

D. Gesbert et al.; "From Theory to Practice: An Overview of MIMO Space-Time Coded Wireless Systems"; IEEE Journal on Selected Areas in Communication, vol. 21, No. 3, Apr. 2003; pp. 281-302.
E. Dahlman, et al.; "A Framework for Future Radio Access"; 61st IEEE Vehicular Technology Conference, 2005; vol. 5, pp. 2944-2948.
International Search Report for Application No. PCT/EP2006/069595; mailed Jan. 25, 2007.

* cited by examiner

*Primary Examiner* — Shuwang Liu
*Assistant Examiner* — David Huang

(57) ABSTRACT

In an OFDM multi carrier modulation method, M sub-carriers are used in a frequency band of a broadband mobile radio channel and several symbols are used in a time band. With application of a MIMO multi-antenna method with T transmitting antennae and R receiving antennae, for all sub-carriers and all symbols, a single, pre-determined, channel-matched transmission strategy is used, which is described by a maximum of T*R complex values on the signal side, independent of the species of the MIMO multi-antenna method and independent of the size of the frequency/time bands.

4 Claims, 1 Drawing Sheet

---

1. Initialize for all users $1 \leq k \leq K$ the covariance matrices $Q_k^1 = \ldots = Q_k^N = I$.

while step-improvement is larger than some small constant do

3. From last step given covariance matrices $Q_k^1, \ldots, Q_k^N$ for all $1 \leq k \leq K$.

4. Solve for all users $1 \leq k \leq K$ the power allocation optimization:

$$p_k^1, \ldots, p_k^N = \arg\max_{p_1, \ldots, p_K} \sum_{k=1}^{K} q_k \sum_{n=1}^{N} \log \det(I + \rho \sum_{k=1}^{K} p_k^n H_k^n Q_k^n H_k^{n,H})$$

subject to $\sum_{n=1}^{N} p_k^n \leq P_k$ and $p_k^n \geq 0$.

5. With fixed power allocation $p_k^1, \ldots, p_k^N$ solve the covariance matrix optimization $$Q_1^n, \ldots, Q_K^n = \arg\max_{Q_1^n, \ldots, Q_K^n} \log \det(I + \rho \sum_{k=1}^{K} p_k^n H_k^n Q_k^n H_k^{n,H})$$

subject to $Q_k^n \succeq 0$ and $\mathrm{tr}(Q_k^n) = 1$ using iterative single-user chunk processing (MAXDET).

end while

FIG 1

1. Initialize for all users $1 \leq k \leq K$ the covariance matrices $Q_k^1 = \ldots = Q_k^N = I$.
   while step-improvement is larger than some small constant do
3. From last step given covariance matrices $Q_k^1, \ldots, Q_k^N$ for all $1 \leq k \leq K$.
4. Solve for all users $1 \leq k \leq K$ the power allocation optimization:

$$p_k^1, \ldots, p_k^N = \arg\max_{p_1,\ldots,p_K} \sum_{k=1}^{K} q_k \sum_{n=1}^{N} \log \det(I + \rho \sum_{k=1}^{K} p_k^n H_k^n Q_k^n H_k^{n,H})$$

subject to $\sum_{n=1}^{N} p_k^n \leq P_k$ and $p_k^n \geq 0$.

5. With fixed power allocation $p_k^1, \ldots, p_k^N$ solve the covariance matrix optimization $$Q_1^n, \ldots, Q_K^n = \arg\max_{Q_1^n,\ldots,Q_K^n} \log \det(I + \rho \sum_{k=1}^{K} p_k^n H_k^n Q_k^n H_k^{n,H})$$

subject to $Q_k^n \succeq 0$ and $tr(Q_k^n) = 1$ using iterative single-user chunk processing (MAXDET).
end while

FIG 2

Using the low SNR approximation, in the fast sum power waterfilling algorithm the effective channels are replaced by their mean channels, i.e.

1. Initialize for all users $1 \leq k \leq K$ the covariance matrices $Q_k^1 = \ldots = Q_k^N = I$.
   while step-improvement is larger than some small constant do
3. Eigenvalue decomposition of effective channels (mean of channels of one $$\text{chunk} \sum_{b=1}^{B} H_k^{n,b,H} Z_k^{n,b,-1} H_k^{n,b} = W_k^n \Lambda_k^n W_k^{n,H}.$$

4. Simultaneous waterfilling for all users $1 \leq k \leq K$ over all carriers $$P_k^1, \ldots, P_k^N = \arg\max_{P_1,\ldots,P_K} \sum_{k=1}^{K} q_k \sum_{n=1}^{N} \log \det(I + \rho \sum_{k=1}^{K} H_k^n P_k^n H_k^{n,H})$$

s.t. $\sum_{n=1}^{N} tr P_k^n = P_k$ and $P_k^n \succeq 0$ (diagonal $P_k^n$).

5. (Line search for optimum weighting factor.)
6. Update transmit covariance matrices.
   end while

METHOD FOR DIGITAL WIRELESS MESSAGE TRANSMISSION OVER A BROADBAND MOBILE RADIO CHANNEL

CROSS REFERENCE TO RELATED APPLICATIONS

This application is based on and hereby claims priority to European Application No. 06000638 filed on Jan. 12, 2006, the contents of which are hereby incorporated by reference.

BACKGROUND

A digital wireless data transmission over a broadband mobile radio channel can be made adaptive and flexible by using the OFDM (Orthogonal Frequency Division Multiplexing) modulation method, and combined cost-effectively with multiple antenna methods (MIMO methods). A general explanation of multicarrier methods and especially the OFDM method is found, for example, in nt.eit.uni-kl.de/forschung/ofdm.html.

In general, the spatial signal processing for the application of MIMO methods can be carried out individually per subcarrier of a multicarrier modulation method. The MIMO OFDM transmission can thus be interpreted as parallel implementation of a number of MIMO single-carrier modulation methods. In principle, a different MIMO method can thus be utilized for each individual subcarrier.

In the existing MIMO methods, the following four categories are distinguished, in principle:
a) non-channel-oriented
b) transmitter-oriented
c) receiver-oriented
d) channel-oriented Category a) includes the diversity methods which manage without any channel information and which only utilize the spatial diversity of the transmission without adapting themselves to the channel, and can also transmit only one data stream simultaneously in the space domain.

In case b) channel information is determined at the receiving end and, taking into consideration the signal processing at the transmitting end, an equalization and possibly a spatial signal separation is performed. This procedure corresponds to the equalization and separation of the traditional MIMO approach in which spatial multiplexing is carried out at the transmitter end without utilizing the channel information.

Category c) largely corresponds to variant b), the channel information being utilized for preequalization at the transmitting end. At the receiver, no channel information is now taken into consideration (e.g. Joint Transmission).

In case d) the signal processing at the transmitting end and at the receiving end is in each case adapted to the instantaneous complete channel information or to a statistical quantity describing the channel (e.g. spatial covariance matrix). Channel-oriented methods have the advantage that the number of data streams to be transmitted in parallel in the space domain can be selectively adapted in dependence on the channel quality already at the transmitting end. This also includes the case where only one data stream is transmitted (e.g. beam forming).

Channel-oriented MIMO methods have the potential of greatest capacity increase because they provide for an adaptation of the signal processing to the channel both at the transmitting end and at the receiving end and, at the same time, diagonalize the channel spatially in such a manner that a number of different spatial transmission modes are produced. To do this, however, the channel information must be present at the transmitter in order to be able to select or adjust the optimal transmission strategy. In the case of TDD-based methods, the channel information needed for transmitting can be determined during the receiving phase since reciprocity of the channel can be assumed. In the case of FDD-based methods, this is not immediately possible. In this case, the channel information must be determined at the receiver and signaled back to the transmitter.

Since the complete channel information comprises the entire information about the broadband channels between all transmitting and receiving antennas, signaling back requires a considerable amount of resources with not insignificant signaling effort. In the case of a MIMO OFDM transmission with N subcarriers, T transmitting antennas and R receiving antennas, $N*T*R$ complex-valued channel coefficients must be signaled back from the receiver to the transmitter if the channel information is provided in the frequency domain.

In general, and with the correct dimensioning of the OFDM signal, the channel impulse response can be represented in the time domain with $W<=N$ channel coefficients, where W is the number of channel coefficients required for describing the channel in the time domain, i.e. channel taps. Very frequently, $W<<N$ applies. In this case, the channel information is transferred into the time domain and only $W*T*R<N*T*R$ channel coefficients need to be signaled back. However, this additionally presents the problem of determining the number of coefficients W actually needed for the instantaneous channel description.

A channel coefficient can be described by a complex number. The $W*T*R$ channel coefficients are generally transmitted individually once per frame duration for each user. Broadband systems can distinguish between slight delay differences of various propagation paths if the reciprocal bandwidth is smaller than the delay difference of the paths. It can thus be generally assumed that with the channel bandwidth, the number W of channel coefficients describing the broadband channel also rises. Independently of the choice of a single- or multicarrier modulation method (such as OFDM), at least $W*T*R$ values must thus be transmitted per user and per frame in a system of bandwidth B, the channel of which can be described by W coefficients over this entire bandwidth.

To keep down the complexity and the signaling expenditure, only one MIMO method is generally used for all subcarriers of the OFDM signal. In methods which utilize the channel information at the transmitter, however, the full instantaneous or time-averaged or statistical channel information is always utilized for determining the transmitting strategies which are individual for each of the N subcarriers.

One representative of the methods which utilize the full instantaneous channel knowledge at the transmitter is the SVD MIMO (Singular Value Decomposition MIMO) method. Time-averaged channel information in the form of the spatial channel covariance matrix is used in Eigenbeam forming, when a number of spatial data streams are transmitted in parallel, or in MRC (Maximum Ratio Combining) beam forming when only one spatial data stream is transmitted.

In methods which transmit a number of spatial data streams in parallel, the transmission strategy for each OFDM subcarrier is described by a matrix, the dimension of which corresponds to $T*R$. This assumes that the OFDM system is dimensioned in such a manner that each subcarrier is subjected to so called "flat fading". This means that the bandwidth is much less than the reciprocal temporal channel dispersion so that for each subcarrier channel, in the case of an antenna, the description by only one single complex channel coefficient is possible. In methods which transmit only one data stream, the transmission strategy per subcarrier is described completely by a vector of dimension T.

This results in the following possibilities:

1. The full channel information is signaled back in the frequency domain, e.g. N*T*R values are transmitted in the case of SVD MIMO or N*T values are transmitted in the case of channel-oriented beam forming. In the first case, up to T parallel data streams can be transmitted via different spatial modes. In the second case, only one data stream can be transmitted simultaneously in the space domain. This procedure is also possible for single-carrier modulation methods with frequency domain equalization.

2. The complete channel information is signaled back in the time domain. In this context, methods are additionally applied which allow the current number of channel coefficients W required for describing a channel to be estimated. Such methods transform the channel transfer function from the frequency domain into the time domain and order in accordance with their amplitude values, for example, the N values thus obtained in the time domain.

If, in this context, a multiplicity of approximately equal smallest amplitude values occur, it is assumed that these values do not contribute to the description of the channel but describe noise. These noise values can be omitted by specifying a corresponding threshold. To determine this threshold, an SNR value to be expected can also be additionally used if it is known. The remaining number W<N of values corresponds to the estimation of the values currently required for the channel description. Before the further use of the channel coefficients, they must be brought back into their original order.

This estimation method bears the risk that the number W is wrongly determined. In addition, the receiver of the signaling information must be informed in some form which value W is currently used as a basis, e.g. after the transmission of the W*R*T values by an additional information item that the signaling of the MIMO coefficients is ended.

To bypass this problem, variant 1 is used in most cases in practice, assuming a maximum possible W=N. In general, this procedure is also possible for signal-carrier modulation methods with frequency domain equalization or time-domain equalization. In the latter case, the transformation of the transfer function from the frequency domain into the time domain is left out.

3. From time to time, spatial covariance matrices or the spatial value, averaged over time, of the channel are only signaled back for Eigenbeam forming or MRC beam forming. This variant is advantageous inasmuch as it only requires a very low mean signaling effort but it does not provide for instantaneous channel adaptation. If, in addition, MIMO methods are changed, this must be additionally reported to the respective transmitter.

SUMMARY

Therefore, an aspect is to provide an improved method of the generic type which offers the possibility of combining high transmission capacity and relatively little signaling effort.

Described in the text which follows is the concept that, for a defined frequency and time band (wherein the frequency band can include a number of subcarriers of the OFDM signal and the time band can include a number of OFDM symbols), only a single spatial transmission strategy adapted to the instantaneous channel, common to all subcarriers and symbols of the band, is used. Furthermore, this transmission strategy, or the channel information from which the transmission strategy can be derived, can be described by a maximum of T*R complex values independently of the size of the frequency/time band (also called "chunk") and independently of the MIMO method to be selected.

If the transmission strategy is obtained at the transmitter from the channel information signaled back from the receiver, the following two possibilities exist with regard to the signaling effort:

a) the full channel information is transmitted from the receiver to the transmitter, T*R complex values being signaled back.

b) Depending on the rank of the channel matrix rang(H), a reduced channel information is signaled back which includes rang(H)*T complex values.

If the transmission strategy is already calculated at the receiver and this is signaled back instead of the channel information, only rang(H)*T real coefficients need to be advantageously communicated since the matrix describing the transmission strategy is hermitic. For the extreme cases of rang(H)=1, this means that a normalized vector with T real phase values is transmitted (beam forming), and for the case of maximum rank, i.e. rang(H)=T, that T^2 real coefficients are transmitted.

Thus, it is also required to signal back only this number of values from the receiver to the transmitter, without additional information about the choice of MIMO method. At the same time, it can be ensured that the joint transmission strategy with respect to the chunk, more precisely with respect to the actual channel over the chunk, is selected in such a manner that the transmission capacity is maximized over the chunk.

According to a further embodiment of the method, the size of the frequency/time band can be varied channel-dependently in steps previously specified. If this is the case, a real value must be signaled back in each case in addition to the values describing the transmission strategy.

According to a further advantageous development of the method, the chunk width can be varied in dependence on the channel characteristics and in dependence on the required capacity. If the required capacity is low, the chunk width over frequency can be selected to be large in spite of a highly frequency-selective channel, in order to keep the signaling effort low.

According to a further conduct of the method, the chunk width is matched either to the mean channel characteristics, i.e. coherence bandwidth and coherence time, or is calculated by the short-time statistics so that a required transmission capacity is maintained.

The real coefficients can be signaled back analog or digitized. Providing for manufacturer-independent implementation in the case of digitized transmission requires a bit-oriented description of the values to be transmitted which must be specified in a standard.

In a further conduct of the method which further decreases the mean signaling effort, signaling does not occur at regular intervals. Depending on the change of the channel with time, it can be agreed that a new transmission strategy is signaled back only when the channel, i.e. particularly the spatial propagation conditions, have changed. Thus, the signaling effort can be varied overall in dependence on requirement. In addition, the method can also be used for reducing the signaling effort in the case of MIMO concepts which utilize statistical channel information, e.g. in the form of spatial covariance matrices or spatial time-averaged channel values for Eigenbeam forming or MRC beam forming during the transmission.

Since MIMO methods are quite phase sensitive, a simple reporting of the channel information via the OFDM symbol (i.e. via the frequency) or the frequency/time band would lead to losses in quality. During the execution of the method, a corresponding maximization of the transmission capacity over the chunk is therefore advisable which appears to be possible as a result of the solution of an optimization problem.

In the text which follows, it will be shown that the optimization problem is convex and can thus be solved by standard algorithms such as MAXDET or SEDUMI; compare also Y. Nesterov and A. Nemirovski, "Interior-Point Polynomial Algorithms in Convex Programming", SIAM, Philadelphia, 1994; and S. Wu, L. Vandenberghe, and S. Boyd, "MAXDET: software for determinant maximization problems", 1996, obtainable Online at www.stanford.edu/~boyd/MAXDET.html.

It is also described below that a suboptimal "chunk processing" is adequate for small SNR values since with a small SNR, no significant gains in capacity can be achieved with the optimal capacity-maximizing method, compared with the suboptimal "chunk processing".

The suboptimal "chunk processing" is wherein a lesser computing complexity. It is thus possible to decide either for one of the two methods in a system or preferably to switch between the two methods in the case of an agreed SNR threshold value. The extent and type of the information to be signaled remain influenced by the choice of the algorithm.

In principle, the procedure can also be applied to broadband single-carrier modulation methods in which the broadband channel is usually described with W channel coefficients. Here, too, only rang(H)*T real values need to be transmitted then instead of the normally used T*R*W complex values. The following advantages are obtained:

Reduced signaling effort: The number of values signaled back can be reduced from N*T*R or, respectively, W*T*R to T*R or, respectively, to rang(H)*T<=T*R per chunk and thus by at least a factor N or, respectively, W per chunk if the chunk includes the entire bandwidth B which is divided into N subcarriers. With M chunks per bandwidth B, the signaling effort is reduced by the factor N/M or, respectively, W/M. If the chunk bandwidth is not selected to be distinctly smaller than the coherence bandwidth, W/M>1 applies. In general, N/M>>1 always applies. If the transmission strategy is already calculated at the receiver and this is signaled back instead of the channel information, only rang(H)*T real coefficients need to be communicated.

Chunk processing with maximum capacity per chunk: Starting with the individual MIMO channels per subcarrier, the transmission strategy at the receiver end for a multiplicity of subcarriers is selected in such a manner that the capacity over the chunk becomes maximum. The corresponding algorithm for this will be explained further below. The chunk width can also be matched to the channel characteristics and the capacity requirement.

No estimating of the number W of the channel coefficients required: The estimating of the number of channel coefficients, which is susceptible to errors, is left out.

SNR dependent switching between a suboptimal and optimal chunk processing for reducing the computing effort is possible.

BRIEF DESCRIPTION OF THE DRAWINGS

These and other aspects and advantages will become more apparent and more readily appreciated from the following description of the exemplary embodiments, taken in conjunction with the accompanying drawings of which:

FIGS. 1 and 2 are each a listing of an algorithm for multi-user capacity optimization of a chunk in embodiments of the method.

DETAILED DESCRIPTION OF EMBODIMENTS

Reference will now be made in detail to the preferred embodiments, examples of which are illustrated in the accompanying drawings, wherein like reference numerals refer to like elements throughout.

The physical channel structure subdivides the available time/frequency resources into the frequency/time bands or chunks mentioned, each of which has a set of orthogonal functions or wave formulae. The chunks are considered two dimensionally and each has a multiplicity of subcarriers in the frequency domain and of a multiplicity of successive OFDM symbols in the time domain. In the text which follows, a uniform space/time processing for all subcarriers and OFDM symbols which belong to a chunk is assumed.

Firstly, the case of a single user is to be considered which is based on the assumption that the timing control exclusively assigns a time/frequency block to one user. The spectral chunk size is B and the channel matrices in a block over these subcarriers are $H_{11}, \ldots, H_B$.

The following problem must then be solved:

$$\max_Q \sum_{b=1}^{B} \text{logdet}(1 + \rho H_b Q H_b^H) \tag{1}$$

where $$'Q \geq 0 \cdot tr(Q) \leq P.$$

The problem involves a spatial MIMO signal processing which is optimal for all MIMO channels in the chunk. Attention must be paid to the fact that the following generally applies: $H_b \neq H_c$. The target function maximizes the mutual information with respect to this chunk and there are also other target functions, for example normalized sum MSE or error rates which can be implemented in this programming approach.

The optimization problem (1) is a convex optimization problem, i.e. the target function is concave in the transmission covariance matrix Q. If the boundary conditions are met, namely the positive semidefiniteness and the track/boundary conditions, the permissible transmission covariance matrices Q originate from a convex set. In general, convex optimization problems can be solved efficiently with any desired accuracy by polynomial-based inside-point methods; compare also NESTEROV (quoted above). In addition, a convex optimization tool by the name of MAXDET was proposed by WU et al. (quoted above) especially for optimizing determinants. The above problem can be expressed in standard maxdet form.

However, the optimization problem does not have a solution in closed form. Until today, neither the optimum transmission directions nor the optimum power allocations can be derived in closed form.

The necessary and adequate Karush-Kuhn-Tucker (KKT) optimization conditions for the problem (1) are given by $$\sum_{b=1}^{B} H_b^H [I + \rho H_b Q H_b^H]^{-1} H_b = \mu 1 - \Psi \tag{2}$$

and $$Q \leq 0, tr(Q) \leq P, \mu \geq 0, \Psi \geq 0, tr(\Psi Q) = 0, \mu[tr(Q) - P] = 0.$$

compare S. Boyd and L. Vandenberghe, "Convex optimization", Cambridge University Press, 2004.

The KKT condition in (2) characterizes the optimum transmission covariance matrix, i.e. the optimum transmission covariance matrix Q must fulfill the KKTt conditions given in (2), and conversely: if a particular matrix Q meets the conditions in (2), this matrix Q is optimal.

For small SNR values, the optimum strategy can be derived in closed form from the following transformation equation:

$$\sum_{b=1}^{B} \log\det(1 + \rho H_b Q H_b^H) = tr\log \prod_{b=1}^{B} [1 + \rho H_b Q H_b^H] \quad (3)$$

For small SNR values, the above equation can be approximated by $$tr\log \prod_{b=1}^{B} [I + \rho H_b Q H_b^H]_{\rho=1} \approx tr\log\left[I + \rho \sum_{b=1}^{B} H_b Q H_b^H\right]. \quad (4)$$

The right-hand side of this approximation equation can be easily solved on the basis of the following maximization problem with the effective channel matrix $$\tilde{H} = \sum_{b=1}^{B} H_b: \max_{Q} \times \log\det[I + \tilde{H} Q \tilde{H}^H] \quad (5)$$

where $Q \geq 0$, $tr[Q] \leq P$.

This is the standard problem in the case of a single-carrier-single-user MIMO with complete channel status information (CSI) at the transmitter. The solution is given by the so-called "waterfilling power allocation" and the optimum transmission directions correspond to the right Eigen vectors of the effective channel matrix; compare E. Telatar, "Capacity of Multi-antenna Gaussian Channels", European Transactions on Telecommunications, vol. 10, pp. 585-595, 1999. In addition, the optimization problem (5) is reduced to the known water filling algorithm for small SNR values.

For large SNR values, the optimum transmission strategy converges to uniform power allocation, i.e.

$$Q = \frac{P}{n_T} I.$$

It must be noted that both chunk processing approaches are combined with a spectral power allocation, i.e. the transmission power of the user is distributed over the chunks for capacity maximization. This power allocation assumes the form of simple water filling over the chunks since these are orthogonal due to the OFDM transmission.

There is apparently a prioritization requirement between the return message overhead, the complexity of signal processing and the performance. Much depends on the spectral chunk size in this case. Two strategies for the adaptation of the chunk size can be considered.

In the first strategy, the chunk size is a fixed point for a particular application scenario. The chunk size is calculated for the corresponding channel model which fits the application scenario best. In this context, the coherence bandwidth and the coherence time are the corner pillars for the choice of the fixed chunk size.

The other strategy involves matching the chunk size to the short-time or long-time CSI. It is assumed that the system control has perfect knowledge of the instantaneous channel conditions. It can therefore calculate the instantaneous capacity loss as a consequence of a particular chunk size. This can be efficiently achieved by a lookup table which contains the losses as a function of the number of taps, of the power delay profile and of the SNR. On the basis of this instantaneous channel status information, the control also decides whether the optimum or suboptimum covariance matrix optimization (with small or large SNR) is to be selected. In the multi-user case, various chunk sizes can be allocated to different users. The delay spread of the channel implementations of the various users leads to different chunk sizes which can be utilized.

To find the correct fitting of the single-user results into a multi-user capacity optimum, the various degrees of freedom in the single-user and multi-user multiple antenna systems must be understood. In addition to spatial signal processing and spectral power allocation, a multi-user diversity is utilized by planning in a number of users over space, frequency and time.

For this reason, the influence of chunk processing on the aggregate capacity is also determined by the multi-user diversity loss. The multi-user diversity yield (sometimes also called planning yield) increases with decreasing spectral chunk size. In the single-antenna FDMA case, numeric results for this were provided in S. Olonbayar and H. Rohling, "Multiuser Diversity and Subcarrier Allocation in OFDM-FDMA Systems", Proc. Of OFDM Workshop 2005.

In the multiple antenna case, FDMA is suboptimal and the planning unit will plan for a number of users simultaneously on the same carrier. A corresponding optimum planning algorithm, as is proposed in H. Boche and E. A. Jorswieck, "Sum Capacity Optimization of the MIMO Gaussian MAC", Proc. WPMC 2002, invited paper; and H. Boche and M. Wiczanowski, "Stability-Optimal Transmission Policy for Multiple Antenna Multiple Access Channel in the Geometric View", will appear in EURASIP Signal Processing Journal, Special Issue on Advances in Signal Processing-assisted Cross-layer Designs, 2006, must be adapted for chunk processing.

FIG. 1 shows an algorithm for capacity optimization for a number of users on one chunk (multi-user case). If the sum capacity is to be maximized, the weight factors $q_1, \ldots q_k$ in line 4 are equal to 1. It must be noted in the algorithm that the multi-user optimization is split into an iterative signal user processing as is described above. The additional power allocation over the users and over the subcarriers is similar to the abovementioned spatial water filling. It can be shown that the algorithm converges to a global optimal solution.

In N. Jindal, W. Rhee, S. Vishwanath, S. Jafar, A. Goldsmith, "Sum Power Iterative Water-Filling for Multi-Antenna Gaussian Broadcast Channels", IEEE Trans. on Information Theory, vol. 51, no. 4, 2005; and R. Böhnke, V. Kühn, K. Kammeyer, "Fast sum rate maximization for the downlink of MIMO-OFDM systems", Proc. Canadian Workshop on Information Theory, 2005, the utilization of a fast optimization algorithm has recently been proposed. To use this algorithm for the case where spectral chunks are to be processed, the transmission strategy must diagonalize the effective channels for all users.

It is then possible to carry out simultaneous water filling over all carriers and all users. This approach is shown in FIG. 2.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

The execution of the method is not restricted to the embodiments explained above and instances of the algorithms explained but is also possible in a multiplicity of modifications which are within the scope of expert action.

A description has been provided with particular reference to embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for digital wireless message transmission over a broadband mobile radio channel with a frequency/time band having a first number of subcarriers and a second number of symbols by using orthogonal frequency division multiplexing multicarrier modulation in a multiple input, multiple output, multiple antenna method using a third number of transmitting antennas and a fourth number of receiving antennas, said method comprising:
   multiple input, multiple output signal processing carried out jointly over a fifth number of subcarriers;
   using, for all subcarriers and symbols, a single predetermined channel-matched transmission strategy, described by a maximum number of complex values at a signaling end, independently of specifics of the multiple input, multiple output, multiple antenna method and independently of a size of the frequency/time band, where the maximum number equals the third number times the fourth number;
   selecting the transmission strategy to maximize transmission capacity over the frequency/time band;
   specifying the width of the frequency/time band over frequency in dependence on predetermined channel characteristics and for staying below a predetermined signaling effort;
   varying the width of the frequency/time band over the frequency in accordance with a predetermined algorithm with a preset step width; and
   signaling, by a receiver, back channel information from which the transmission strategy can be derived, including a fifth number of complex values per channel, where the fifth number equals a rank of a channel matrix times the third number.

2. The method as claimed in claim 1, further comprising matching the width of the frequency/time band to mean channel parameters, particularly a coherence bandwidth and coherence time.

3. The method as claimed in claim 1,
   further comprising
      calculating by a receiver the transmission strategy, and
      signaling back to the transmitter the transmission strategy instead of channel information, and
   wherein a sixth number of real values are communicated per channel in dependence on a rank of a channel matrix, where the sixth number equals the rank of the channel matrix times the third number.

4. A method for digital wireless message transmission over a broadband mobile radio channel with a frequency/time band having a first number of subcarriers and a second number of symbols by using orthogonal frequency division multiplexing multicarrier modulation in a multiple input, multiple output, multiple antenna method using a third number of transmitting antennas and a fourth number of receiving antennas, said method comprising:
   multiple input, multiple output signal processing carried out jointly over a fifth number of subcarriers;
   using, for all subcarriers and symbols, a single predetermined channel-matched transmission strategy, described by a maximum number of complex values at a signaling end, independently of specifics of the multiple input, multiple output, multiple antenna method and independently of a size of the frequency/time band, where the maximum number equals the third number times the fourth number;
   selecting the transmission strategy to maximize transmission capacity over the frequency/time band;
   signaling of the transmission strategy, performed by a receiver signaling back channel information from which a transmission strategy can be derived, only carried out in response to a change in the mobile radio channel with time; and
   communicating a sixth number of complex values per channel in dependence on a rank of a channel matrix, where the sixth number equals the rank of the channel matrix times the third number.

* * * * *